3,238,173
POLYSTYRENE-POLYISOPRENE-POLYSTYRENE BLOCK COPOLYMER LATICES AND PROCESS FOR THEIR PREPARATION
Joseph T. Bailey, Torrance, and David D. Nyberg, San Pedro, Calif., assignors to Shell Oil Company, New York, N.Y., a corporation of Delaware
No Drawing. Filed Sept. 27, 1962, Ser. No. 226,755
3 Claims. (Cl. 260—29.7)

This invention relates to the preparation of concentrated latices of block polymers having improved mechanical stability and to the latices per se.

Synthetic rubber latices may be prepared by emulsion polymerization, which for some uses is followed by latex stripping, concentration and perhaps particle agglomeration. If, however, a solution polymerization system is employed, then additional process steps are required for converting the rubber cement so formed into a latex. Recent developments in the elastomer and macromolecular field have enabled the production of block polymers wherein the blocks are alternating groups, one of which has elastomeric properties and the other of which is a non-elastomeric type. These may be typified by the general configurations A–B, A–B–A and B–A–B, wherein A is represented as a non-elastomeric polymer block, i.e., has a high glass transition temperature and B is an elastomeric polymer block (low glass transition temperature). Many of these newer types of block polymers have interesting and even unique properties. For example, the types represented as A–B–A may be referred to as "self-vulcanizing" rubbers in that vulcanization there (e.g., with sulfur compounds) is usually unnecessary since they exhibit the properties of an ordinary rubber which has been vulcanized after moderate heating. The reverse type of double-end block polymer represented by the general configuration B–A–B is especially useful in adhesive compositions and the like. Both types are of considerable interest for the reinforcing and other modification of ordinary diene rubbers such as polybutadiene or polyisoprene and the single ended block polymer, having the general configuration A–B, is likewise of considerable interest for this purpose.

One of the useful forms in which rubbers and macromolecules are utilized commercially is that of latices. These are especially important for coating compositions (especially when pigmented) and for the preparation of foams, dipped goods, thread and related products. Such latices are usually relatively highly concentrated, that is, having a polymer (including elastomer) content in excess of about 25% by weight. In order to be commercially useful, latices must not only be concentrated to at least this extent but also must exhibit a reasonable degree of stability which is generally referred to as "mechanical stability," by which is meant its general resistance to deposition in the form of a coagulum. Coagulation may occur under many circumstances, but is especially evident when a dilute latex is concentrated by such means as creaming or centrifuging. It is also of material importance when the latex is stored for a period of time between manufacture and its ultimate utilization as well as when subjected to freezing and thawing such as may occur during cold weather storage and transportation.

The block polymers with which the present invention is concerned present a special problem in that most of them are capable of dilute latex formation but when many of these dilute latices are concentrated serious coagulation occurs, particularly when the block polymers contain more than about 20% by weight of blocks of type A, preferably 20–80% by weight of the polymer.

This is presumably due to the strong internal order forces of such polymers which comprise alternating elastomer and non-elastomeric blocks. Indeed, in many instances the particles which result from latex formation of block polymers are non-spherical in shape, resembling disc or acorn shapes instead.

Now, in accordance with the present invention, a means has been found for the preparation of stable concentrated latices of block polymers, as represented in the structures given hereinbefore, containing more than about 20% by weight of type A blocks, which comprises emulsifying a cement of the block polymer in an amount of aqueous emulsifier solution sufficient to form a dilute latex, removing the cement solvent, contacting the dilute latex so formed with a normally liquid aliphatic hydrocarbon which is a non-solvent for the non-elastomeric block but is a solvent for the elastomeric block of the polymer for a period of one-fourth to 24 hours, removing the liquid aliphatic compound and thereafter concentrating the latex to form a stable latex having a polymer content in excess of about 25% by weight.

Still in accordance with the present invention, novel latices are provided having a concentration of block polymer in excess of about 25% by weight which are mechanically stable and wherein the polymer particles are substantially all spherical in configuration, said polymers comprising at least 5% by weight of type A blocks, preferably at least 20% of A blocks. In further accordance with this invention, reinforced latices are provided comprising mixtures of a diene rubber with spherical block polymer particles, the latex being of either the internally reinforced or externally reinforced types as more fully discussed hereinafter.

An internally reinforced latex is one in which each polymer particle contains both polymer and reinforcing agent, while an externally reinforced latex comprises separate particles of polymer and reinforcing agent.

A special process of the invention comprises that by which the externally reinforced type of diene rubber-block polymer latex may be prepared which comprises utilizing the steps of the concentrated latex preparation as outlined hereinbefore but including in place of the aliphatic treating agent a cement formed of a diene rubber dissolved in an aliphatic hydrocarbon, the latter cement preferably being in the form of an unstripped latex.

The polymers with which the present invention are concerned are generally divided into the three types referred to hereinbefore. The blocks A are independently selected non-elastomeric polymer blocks having an average molecular weight of 2,000–100,000 and a glass transition temperature above about 25° C. and the blocks B are independently selected elastomeric polymer blocks having an average molecular weight between about 25,000 and 1 million, the glass transition temperature being below about 10° C. Preferably, the block polymers are those in which the elastomeric polymer block is that of a conjugated diene. Still more preferably, the block polymers are those in which the end blocks comprise polymer blocks of an alkenyl aromatic hydrocarbon connected by a block of a polymerized conjugated diene, the latter being one capable of having a cis 1,4-content of 80–100%, as exemplified by polyisoprene. These block polymers include a special variety in which at least one of the blocks may be referred to as a "tapered block" in which the block has an increasing proportion from one end to the other of units of a monomer promoting either elastomeric or non-elastomeric properties in the block.

For the purpose of the present invention, the definition of an elastomeric substance is that expressed in ASTM Special Technical Bulletin No. 184 as follows:

"A substance that can be stretched at room temperature to at least twice its original length and, after being stretched and the stress removed returns with force to approximately its original length in a short time."

The blocks from which block polymers of any one of the three general categories may be derived may contain blocks of alpha olefins, and copolymer blocks thereof of either rubbery or plastic varieties depending upon the ratio of olefins in such copolymers as known in the art. For example, rubbery copolymer blocks of ethylene and propylene are formed when the ethylene content is 60–70%. Preferred non-elastomeric ethylene-propylene copolymer blocks are those having 80–95 mol percent ethylene. The elastomeric blocks are preferably those of aliphatic conjugated dienes such as isoprene, methylisoprene, butadiene, copolymers of styrene-butadiene and of butadiene-acrylonitrile.

The non-elastomeric blocks, constituting at least about 20% by weight of the polymer, may comprise homopolymers of the lower olefins or of styrene, methyl styrene, methyl methacrylate and the like. Vinyl aromatic polymer blocks are included and are preferably those made from one or more monovinyl aromatic hydrocarbons of the benzene series such as styrene, vinyl toluene, etc. Suitable block polymers which typify the classes of materials considered herein are the following:

Styrene-isoprene-styrene
Styrene-butadiene-styrene
Styrene-isoprene
Styrene-butadiene
Isoprene-styrene-isoprene
Butadiene-styrene-butadiene
Isoprene-styrene-butadiene The block polymers of this invention may be made by processes involving the sequential formation of the individual blocks. More specifically, the polymers are formed, for example, by polymerizing styrene in the presence of a lithium based initiator or a Ziegler type catalyst, introducing isoprene and permitting the polymerization to continue until all of the monomer is consumed and thereafter introducing a second portion of styrene.

The block polymers of interest in the present invention present a special problem of solubility in that the elastomeric blocks tend to be more soluble in certain solvents while the blocks in which non-elastomeric units predominate exhibit higher solubility in a different set of solvents. For the most part however, a solvent in which the block polymer is fully miscible comprises an aromatic hydrocarbon (or other aromatic compound), such as benzene, toluene, xylenes, or cycloalkanes such as cyclohexane, etc. The problem occurs with respect to unstable latex particle formation when such cements of block polymers are utilized for the formation directly of latex composition.

The cements useful in the process of this invention should preferably contain between about 5% and about 20% by weight of the block polymer. These are emulsified with a substantial amount of water containing an emulsifying agent of either nonionic, cationic or anionic types, the latter being preferred; and of these the soap-type emulsifying agents are considered to be optimum. Specifically, the alkali metal soaps of monocarboxylic acids such as $C_{12-20}$ fatty acids, rosin acids, tall oil acids and the like are preferred. Proprietary emulsifying agents may be employed in place thereof or in addition thereto. It is important to utilize an amount of water sufficient to cause the formation of a dilute emulsion containing a block polymer to water weight ratio between about 1:10 and about 1:50. If more concentrated emulsions are prepared and the cement solvent thereafter removed, the aspects of latex instability may become evident. Therefore, it is essential in the initial step of the present latex formation process to restrict the weight ratio of polymer to water within the above recited limits.

Emulsification can take place by any of the well-known means for this purpose and the specific means utilized does not form an essential aspect of the persent invention.

The amount of emulsifying agent required for suitable emulsification usually ranges from 5–30 parts by weight per hundred of polymer (phr.), but the amount that is contained in the concentrated latex eventually isolated is most preferred when it is below about 5 phr., 1–3 phr. being most suitable.

Following the formation of the emulsion as described, the solvent of the block polymer cement is then removed by simple flashing techniques, if possible, or by creating and collapsing a foam. The foam comprises evaporated solvent in intimate admixture with a liquid aqueous phase and rubber which has now been transferred from its original solvent cement phase into the water in the form of finely dispersed particles.

If the solvent removal operation does in fact result in a stable foam formation, this can actually be capitalized upon by encouraging rather than depressing the foam formation, permitting all of the emulsion to be converted into foam which is thereafter collapsed by lowering temperature to the extent that the vaporized solvent is condensed to a liquid phase which is separate from the aqueous phase now containing suspended polymer particles in the form of a dilute latex.

The precise temperature at which foam is formed or solvent is flashed off will depend largely upon the boiling point of the solvent, as well as the temperature to which the composition is cooled. If simple flash evaporation is all that is required to separate the cement solvent from the dilute latex, the apparatus is substantially less complicated than that required for foam generation and collapse.

The next stage in the process of this invention comprises the treatment of the dilute latex formed by cement solvent removal with liquid normal alkane which is not only insoluble in water but also is a non-solvent (for all practical purposes) for the non-elastomeric blocks of the block polymers. The dilute latex of this stage contains, as stated hereinbefore, a weight ratio of polymer to water between about 1:10 and 1:50, the more concentrated ratio being that limitation imposed upon the system by incipient coagulation of the block polymer at higher concentrations. The more dilute ratio (1:50) is simply an economical maximum beyond which it is impractical to dilute the emulsion since this simply means the handling of greater quantities of dilute latex without any resulting technical advantage.

The liquid treating agent utilized as the essential component at this stage of the process is one which has the characteristics of being substantially insoluble in water and susbtantially a non-solvent for the non-elastomeric block of the block polymer. The most desirable class of materials having these characteristics comprises that of aliphatic hydrocarbons which are liquid under the conditions of the treatment, namely, between 0° and 100° C. Consequently, the aliphatic hydrocarbons preferred for this purpose include the straight chain, branched chain and cyclic saturated hydrocarbons, e.g., normal alkane, isoalkanes and cycloalkanes. Suitable species include propane, butanes, pentanes, hexanes, heptanes, octanes, decanes, and dodecanes. Mixtures of the aliphatic compounds are useful as well and in commercial practice such will almost always be used. The optimum aliphatic hydrocarbon for use in the present process comprise $C_{4-8}$ normal hydrocarbons.

It is a preferred practice in utilizing these treating agents to mix intimately with the dilute latex and leave them in contact therewith fro a period of time varying from about ¼ hour to about 24 hours. A shorter time of contact may be at times utilized but under the usual conditions and with the contemplated block polymers, a longer contact time is normally required, preferably 2–12 hours. Longer contact times than 1 day may be employed but substantially no benefit is obtained thereby.

It is preferred to intimately disperse the normal alkane in dilute latex by agitation, shaking, stirring or emulsification. The latter provides the maximum contact with the latex particles and will enable the use of shorter treatment periods than if mere agitation is employed. Since the system already contains emulsification agents, that is usually a simple matter and can be effected by simple agitation.

The proportion of treating liquid which is employed for this purpose is preferably kept to a minimum, the most suitable ration being a weight ratio of liquid treating material to polymer between about 0.1:1 to 5:1. Subsequent to the treatment period, the treating liquid is removed in substantially the same manner as the cement solvent in the previous step described hereinbefore. This may be either by simple flashing technique or if the system is such as requires it, a foam creation and foam collapse followed by separation of condensed treating liquid from the dilute latex.

Having treated the block polymer latex in such a way as to alter the physical form of the latex particles in the direction of promoting mechanical stability of the latex, concentration may be effected either by a creaming operation or, more preferably, by centrifuging. In the absence of the essential treating step according to the present invention, it is during this concentration step that the disadvantageous coagulation of block polymers latices has been found most often to occur. If, however, the treating step is employed in accordance with the prescribed procedure, concentration does not cause coagulation to any appreciable extent or, under the most favorable circumstances, to any extent at all.

The concentration is preferably conducted in a centrifuge, the amount of aqueous "serum" removed being sufficient to create a concentrated latex containing at least about 25% by weight of block polymer in substantially spherical particle form and preferably between about 35 and 70% by weight thereof. The most noteworthy change which can probably account for the improvement in mechanical stability of the resulting latices is the virtual disappearance of non-spherical latex particles and the creation of particles in their place which are substantially spherical.

One of the potentially important uses of block polymers is for the reinforcement or modification of ordinary diene elastomers and latices thereof. Heretofore, however, it has been substantially impossible to compound concentrated latices containing both the subject block polymers and diene rubbers in view of the mechanical instability of the former. The present process enables the production of latices, which may be mixed with pre-formed diene rubber latices, although one aspect of the present process comprises a special alternative thereto by which a combined diene rubber-block polymer latex of substantially improved mechanical stability can be produced.

Another process comprises mixing the cement of a diene rubber, e.g., polyisoprene dissolved in $C_{4-7}$ aliphatic hydrocarbons, with a cement of the block polymer prior to emulsification.

According to one variation, a rubber cement of a diene rubber in an aliphatic solvent therefor is employed in place of or in addition to the aliphatic treating liquids described hereinbefore preferably in the form of an unstripped latex. Under these circumstnces, the rubber cement, produced for example in a solution polymerization process of isoprene wherein the solvent therefor is a $C_4$–$C_7$ hydrocarbon such as a mixture of pentenes may be added directly to the dilute block polymer latex, preferably emulsified or at least intimately mixed therewith for a period of ¼–24 hours after which the diene rubber solvent is removed and the modified latex concentrated as described hereinbefore.

One aspect of the present invention comprises the addition of the subject latices to asphalt cut-backs (50–90% asphalt of 150–190° F. softening point) in an amount of 0.5–15% block polymer based on asphalt and subjecting the mixture to a high shear ranging in rate from $10^4$ to $5 \times 10^6$ reciprocal seconds. The "rubberized asphalts" so formed are particularly effective since, upon subsequent heating prior to utilization as in paving, the block polymers self-vulcanize and thus improve asphalt properties.

The following examples illustrate the process and products of the present invention. In all of the examples, the emulsifying agent employed was the potassium soap of rosin acids utilized as a 1% aqueous solution. Centrifuging was effected by a tubular centrifuge operated at about 20,000 r.p.m.

Example I

A block polymer having the configuration isoprene-styrene-isoprene was prepared by polymerizing isoprene with butyl lithium in benzene solvent at 35–40° C., adding styrene after most of the isoprene had polymerized, allowing substantially all of the styrene to polymerize and thereafter adding a second quantity of isoprene. The block polymers so formed had an average molecular weight of about 200,000 and 27% bound styrene content. 1 part by weight of the polymer solution containing 6.8% polymer in benzene was emulsified with 2.17 parts of aqueous soap solution. Benzene was removed by distillation. On centrifuging the resulting latex, which contained 4.2% polymer, complete coagulation occurred.

100 parts by weight of the dilute latex was mixed with 8 parts by weight of normal heptane in a closed vessel for about 12 hours. The heptane was then stripped from the latex in a disc evaporator, water being added to keep the volume approximately constant. Upon centrifuging the resulting latex to a solids content in the order of 60–70%, a concentrated latex was formed with no coagulation being observed. The block polymer particles were essentially all spherical.

Example II

When the same operation is repeated utilizing toluene in place of normal heptane, the latex coagulated almost completely during the subsequent concentration step.

Example III

A styrene-isoprene block polymer having an average molecular weight of about 330,000 was prepared, containing about 30% bound styrene. 1 part by weight of the polymer solution (7.8% solids in benzene) was emulsified with 2.2 parts by weight of the aqueous soap solution and the benzene removed by distillation. On centrifuging the resulting latex to remove part of the aqueous phase, the concentrated latex coagulated. The latex particles under microscopic examination appeared to be flattened discs.

100 parts by weight of the dilute latex (4.7% solids) which had not been centrifuged was mixed with 8 parts by weight of normal heptane in a closed vessel for about 12 hours. The latex was stripped of heptane in a disc evaporator, water being added to keep the volume approximately constant. The resulting latex was then centrifuged as before, and exhibited substantially improved mechanical stability, the particles being microspheres.

Example IV

A block polymer 290,000 average molecular weight having the units styrene-isoprene-styrene was prepared by stagewise polymerization in benzene utilizing butyl lithium as the initiator to form a block polymer containing about 24 weight percent of bound styrene. 1 part by weight of the polymer solution (10.7% solids in benzene) was emulsified with 1.9 parts of soap solution and the benzene removed by distillation. On centrifuging, the resulting latex coagulated during the concentration periods.

Example V

The same polymer employed in the previous example was emulsified with sufficient aqueous soap solution to form an emulsion comprising 2.5 weight percent of solids based on water. Benzene was removed by distillation after which isopentane was added to the dilute latex and mixed therewith for about 12 hours. The isopentane was then removed by distillation and the resulting latex was concentrated by centrifuging without the formation of any coagulum. When toluene was employed in place of isopentane, the resulting latex coagulated completely during concentration.

We claim as our invention:

1. The process for the preparation of a stable reinforced latex composition which comprises
    (a) emulsifying a cement of a block copolymer having the general configuration

A–B–A wherein each A is an independently selected non-elastomeric vinylaromatic polymer block and B is an elastomeric conjugated diene polymer block, said blocks comprising at least 20% by weight of the copolymer, the copolymer being dissolved in a cyclic hydrocarbon solvent, the cement being emulsified with an amount of water sufficient to provide a polymer:water weight ratio between 1:10 and 1:50;
    (b) removing solvent therefrom, whereby a dilute latex is formed;
    (c) emulsifying therein a conjugated diene homopolymer rubber cement, the cement solvent being a liquid normal alkane solvent, said solvent having 3–12 carbon atoms per molecule, said emulsifying being made in the absence of intervening concentration of the dilute latex, the weight ratio of alkane to block polymer being between 1:1 and 5:1;
    (d) holding the composition so formed for ¼–24 hours;
    (e) removing the alkane solvent;
    (f) and removing water from the treated latex, the concentrated latex having a combined rubber and block copolymer content of at least 25% by weight.

2. The method of producing a stable concentrated latex of a block copolymer having a general configuration of the group consisting of A–B–A, B–A–B, and A–B wherein each A is an independently selected non-elastomeric vinyl-aromatic polymer block and B is an elastomeric conjugated diene polymer block, the A block content being at least 20% by weight of the copolymer, which comprises:
    (a) emulsifying a cement of the block copolymer wherein the cement solvent comprises a cyclic hydrocarbon, with water, whereby an emulsion is formed having a polymer-to-water weight ratio between 1:10 and 1:50;
    (b) removing the cyclic solvent, whereby a dilute latex is formed;
    (c) mixing therewith a liquid normal alkane having from 3–12 carbon atoms per molecule, the weight ratio of alkane to polymer being between 1:1 and 5:1, said mixing being made in the absence of intervening concentration of the dilute latex;
    (d) holding the so-modified latex for ¼–24 hours;
    (e) removing the liquid alkane;
    (f) and removing water from the treated latex whereby a latex of improved stability having a polymer content of at least about 25% is obtained.

3. A process according to claim 2 wherein the block copolymer has the general configuration polystyrene-polyisoprene-polystyrene.

References Cited by the Examiner

UNITED STATES PATENTS

| | | | |
|---|---|---|---|
| 2,799,662 | 7/1957 | Ernst et al. | 260—29.7 |
| 3,078,254 | 2/1963 | Zelinski et al. | 260—879 |

MURRAY TILLMAN, *Primary Examiner.*

LOUISE P. QUAST, *Examiner.*